(12) United States Patent
May

(10) Patent No.: US 9,634,543 B2
(45) Date of Patent: Apr. 25, 2017

(54) ENERGY TRANSFORMING UNIT FOR DISTANCE MEASUREMENT SENSOR

(71) Applicant: STEMCO Kaiser Incorporated, Millington, MI (US)

(72) Inventor: Lutz May, Berg (DE)

(73) Assignee: STEMCO KAISER INCORPORATED, Millington, MI (US)

( * ) Notice: Subject to any disclaimer, the term of this patent is extended or adjusted under 35 U.S.C. 154(b) by 84 days.

(21) Appl. No.: 14/098,866

(22) Filed: Dec. 6, 2013

(65) Prior Publication Data
US 2014/0197643 A1     Jul. 17, 2014

(30) Foreign Application Priority Data
Jan. 17, 2013  (EP) .................................... 13151663

(51) Int. Cl.
| | |
|---|---|
| H02K 7/18 | (2006.01) |
| F03G 1/00 | (2006.01) |
| F16F 9/02 | (2006.01) |
| F16F 9/32 | (2006.01) |
| B60G 13/14 | (2006.01) |

(52) U.S. Cl.
CPC ........... *H02K 7/1853* (2013.01); *B60G 13/14* (2013.01); *F03G 1/00* (2013.01); *F16F 9/02* (2013.01); *F16F 9/3292* (2013.01); *B60G 2300/60* (2013.01)

(58) Field of Classification Search
CPC ... B60G 13/14; B60G 2300/60; F16F 9/3292; F16F 9/02; F03G 1/00; H02K 7/1853
USPC .......................... 290/1 E, 1 R, 43, 44, 54, 55
See application file for complete search history.

(56) References Cited

U.S. PATENT DOCUMENTS

| | | | | |
|---|---|---|---|---|
| 8,368,240 | B1* | 2/2013 | Burkett | 290/44 |
| 2008/0307787 | A1* | 12/2008 | Pettersson | F01N 5/04 60/624 |
| 2009/0206608 | A1* | 8/2009 | Koola et al. | 290/53 |
| 2010/0045042 | A1* | 2/2010 | Hinders et al. | 290/52 |
| 2010/0066051 | A1* | 3/2010 | Haugen | 280/124.157 |
| 2010/0207308 | A1* | 8/2010 | Leonard | 267/64.11 |
| 2010/0225527 | A1* | 9/2010 | Talty et al. | 342/145 |
| 2010/0308589 | A1* | 12/2010 | Rohrer | 290/53 |

(Continued)

FOREIGN PATENT DOCUMENTS

| | | |
|---|---|---|
| DE | 10 2006 017 275 A1 | 10/2007 |
| DE | EP 1845278 A1 | 10/2007 |

(Continued)

*Primary Examiner* — Viet Nguyen
(74) *Attorney, Agent, or Firm* — Perkins Coie LLP

(57) ABSTRACT

The subject invention relates to an air spring (1) with a distance measurement sensor (100), an energy transforming unit (200), a first mounting element (10) being adapted for being mounted to a first vehicle portion (2) and a second mounting element (20) being adapted for being mounted to a second vehicle portion (3). An air volume (50) is arranged between the first mounting element and the second mounting element. The energy transforming unit is adapted to transform a transition of the air spring from a first state (s1) of the air spring to a second state (s2) of the air spring into electrical energy and to provide the generated electrical energy to the distance measurement sensor. The energy transforming unit is arranged in the air volume (50) of the air spring.

18 Claims, 4 Drawing Sheets

(56) References Cited

U.S. PATENT DOCUMENTS

| | | |
|---|---|---|
| 2011/0084503 A1* | 4/2011 | Li et al. ................... 290/1 R |
| 2011/0266801 A1* | 11/2011 | Sainio ......................... 290/48 |
| 2012/0029871 A1* | 2/2012 | Spillane ..................... 702/158 |
| 2012/0056616 A1 | 3/2012 | May ........................ 324/207.15 |
| 2012/0153629 A1* | 6/2012 | Sanchez ........................ 290/54 |
| 2012/0153633 A1* | 6/2012 | Kolbenschlag ..... F16K 37/0033 290/1 A |
| 2012/0269633 A1* | 10/2012 | Danforth et al. ......... 416/170 R |
| 2013/0154280 A1* | 6/2013 | Tucker et al. ............... 290/1 R |
| 2014/0124994 A1* | 5/2014 | May .......................... 267/64.27 |
| 2014/0139352 A1* | 5/2014 | May ........................ 340/870.07 |

FOREIGN PATENT DOCUMENTS

| | | |
|---|---|---|
| DE | 10 2008 064 647 A1 | 2/2010 |
| EP | 2366972 A2 | 9/2011 |
| GB | 245334 A | 12/2008 |
| WO | WO 2011159874 A2 * | 12/2011 |

\* cited by examiner

ENERGY TRANSFORMING UNIT FOR DISTANCE MEASUREMENT SENSOR

This application claims benefit of European Patent Application Serial No. EP 13151663.5, filed on Jan. 17, 2013. The teachings of European Patent Application EP 13151663.5 are incorporated herein by reference in their entirety.

FIELD OF THE INVENTION

The invention relates to an energy transforming unit for a distance measurement sensor of an air spring and an air spring for a vehicle having an energy transforming unit for generating electrical energy and providing the electrical energy to a consumer.

BACKGROUND OF THE INVENTION

Height or distance measurement has a wide variety of possible applications. However, the environment where the height measurement is being made can present a wide variety of challenges. This is particularly the case in situations where height or distance measurements are being made in automotive applications. For example, in measuring the height of a vehicle frame above the surface of a road, challenges are typically presented by road noise, dirt, dust, and vibrations which are normally present in the environment surrounding the vehicle where the measurement is being taken.

DE 10 2006 017 275 A1 and EP 1845278 A1 describe an air spring having an integrated positioning device, wherein the distance between two parts of the air spring can be measured by an analogue proximity sensor. Commonly used proximity sensors are, for example, based on an ultrasonic measurement principle which is very sensitive in noisy and vibrating environments, as the acoustic noise and the ultrasonic measurement principle are based on the same physical principle, i.e. sound propagation. These pneumatic air springs have an integrated height measuring device, a pressure chamber or an inner chamber. The exterior of the inner chamber is aligned in the analog proximity sensor and a metal plate is arranged opposite to the interior of the proximity sensor. The proximity sensor and the metal plate are formed pre-adjustable to each other.

Further, DE 10 2008 064 647 A1 describes an air spring for a vehicle having a measuring device, which measuring device may transmit data and energy via predetermined and fixed distance contactless. This pneumatic cushioning equipment has a base unit which has a pressure source and a valve unit which has an air supply made of non-metallic material, particularly plastic. A switching valve of the base unit is provided between the pressure source and appropriate valve unit of the arranged air supply.

United States Patent Publication No. 2012/0056616 A1 and EP 2 366 972 describe a sensor device for height measurement in an air spring and a corresponding method allowing determining changes in a working stroke of the air spring. These publications more specifically disclose a sensor device for a height measurement, comprising: a transceiving coil arrangement including at least one transceiving coil; a transmitting drive unit; a receiver unit; a reference coil arrangement; and a reference control unit, wherein the transceiving coil arrangement is coupled to both the transmitting drive circuit and the receiver unit, wherein the reference control unit is coupled to the reference coil arrangement, wherein the reference coil arrangement is movably positioned with respect to the transceiving coil arrangement, wherein the drive unit is adapted to drive the transceiving coil arrangement with an AC power signal of a predetermined duration for generating a magnetic field, wherein the reference control unit is adapted for accumulating energy out of the generated magnetic field and for generating a reference signal based on an amount of the accumulated energy, and wherein the receiver unit is adapted for receiving the reference signal and for outputting a signal for determining a distance between the transceiving coil arrangement and the reference coil arrangement based on at least one out of a group, the group consisting of the reference signal and the duration of the AC power signal.

SUMMARY OF THE INVENTION

An objective of the subject invention to provide an energy transforming unit having a reduced amount of wiring for utilization in conjunction with an air spring which is equipped with a distance measurement device.

According to an aspect of the present invention, an air spring is provided which comprises a distance measurement sensor, an energy transforming unit, a first mounting element being adapted for being mounted to a first vehicle portion, a second mounting element being adapted for being mounted to a second vehicle portion, and an air volume arranged between the first mounting element and the second mounting element. The energy transforming unit is adapted to transform a transition of the air spring from a first state of the air spring to a second state of the air spring into electrical energy and to provide the generated electrical energy to the distance measurement sensor. The energy transforming unit is situated in the air volume of the air spring.

The air spring as described above and hereinafter is adapted to avoid guiding through wires and does not require means for transferring or transmitting electrical energy from outside of the air spring to inside of the air spring where the electrical energy consuming sensing devices for measuring the height or working stroke are arranged. The electrical energy required by the sensing devices, i.e. by the distance measurement sensor is generated inside of the air spring by transforming for example potential energy or energy generated by a varying air pressure within the air volume of the air spring into electrical energy. It should be noted that the term air volume as used herein is the volume of any gas or mixture of gases, including but not limited to air, nitrogen, the Nobel gases, such as helium, and various mixtures thereof.

According to one embodiment of this invention, the transition from the first state to the second state implies a changing or a modification of a gas pressure or air pressure within the air volume of the air spring. This change in air pressure can be due to a movement of one of the first mounting element and the second mounting element towards the other one of the first mounting element and the second mounting element. Such a movement of one of the first mounting element and the second mounting element toward the other one may be the result of a movement of the first vehicle portion or second vehicle portion which is encountered during the operation of the vehicle onto which the air spring in mounted. Accordingly, the energy transforming unit is adapted to transform or convert potential energy within the air spring into electrical energy and to provide the electrical energy to the distance measurement sensor and its sensing electronics.

In accordance with a further embodiment of this invention, the electrical energy is generated by induction in a coil, which is attached to one of the first mounting element and the second mounting element, wherein an electrical current is induced when the coil is moved along and with respect to a magnetic element.

According to a further embodiment of this invention, the energy transforming unit comprises a movable element and a generator, wherein the movable element is adapted for being moved when transitioning from the first state to the second state and is adapted to drive the generator, wherein the generator generates the electrical energy. The electrical generator may be a dynamo which is adapted to generate electrical energy from mechanical or kinetic energy. By virtue of the fact that the energy transforming unit is adapted to transform or generate electrical energy inside of the air spring the maintenance requirements of the air spring may be reduced because no energy storage element has to be maintained or replaced.

In another embodiment of this invention, the movable element is a propeller, wherein the propeller is adapted to being rotated when the pressure in the air volume of the air spring varies as a result of the transition from the first state to the second state. In this embodiment of the invention, the propeller is mechanically coupled to the generator via an axis. The propeller may be rotated by an air or gas flow, for example, when the air volume is filled up with gas prior to starting an operating state of the air spring, i.e. before starting to drive a vehicle. In any case, the propeller is arranged so as to be rotated as a result of the gas flow or air flow over the surface thereof. According to a further embodiment, the energy transforming unit comprises a housing with an opening, wherein housing comprises rigid walls. The propeller is arranged in the opening and is adapted to being rotated when an air pressure in the air volume of the air spring varies so as to cause an air flow through the opening.

The walls of the housing may be rigid in order not to be deformed plastically or elastically when the gas pressure within the air volume of the air spring changes or is being modified. Thus, when modifying the gas pressure within the air volume, an air flow is caused between the interior space outside of the housing and the interior space inside of the housing through the opening, as the gas pressure tends to equalize in the complete interior space, i.e. being homogenous in the complete air volume. The said air flow causes the propeller to rotate and will drive the generator as to generate electrical energy.

According to a further embodiment of this invention, a rotation plane of the propeller extends along an opening plane of the opening such that a rotation axis of the propeller extends along an air flow direction through the opening. In other words, the rotation axis of the propeller extends along a direction of the air flow through the opening and may in particular be parallel to the air flow direction. At least one directional component of the rotation plane of the propeller is parallel to the opening plane of the opening.

In one embodiment of this invention, the rotation plane of the propeller intersects the opening plane, i.e. the rotation plane is arranged transverse or cross with respect to the opening plane.

According to a further embodiment, the rotation plane of the propeller is parallel to an opening plane of the opening. In this embodiment, the rotation axis is orthogonal with respect to the opening plane and the air flow direction through the opening is orthogonal to the rotation plane and parallel to the rotation axis.

In a further embodiment of this invention, the rotation plane and the opening plane coincide, i.e. the propeller is located within the opening of the housing, i.e. in between the inner walls of the opening or surrounded or enclosed by the wall of the housing forming the opening.

According to a further embodiment, the housing comprises an interior space such that a variation of the air pressure in the air spring leads to an air exchange between the interior space outside the housing and the interior space inside the housing through the opening, wherein the air exchange causes the propeller to rotate.

The air volume is separated into two sections by the walls of the housing: a first section within the air spring and outside of the housing and a second section within the air spring and inside of the housing. An air flow from the first section to the second section in case of a pressure modification in one of the sections with respect to the other one of the sections is lead through the opening, wherein the air flow leads to a rotational movement of the propeller and thus to a transformation of kinetic energy to electrical energy by the generator. The opening of the housing may in particular extend in one plane, i.e. being an opening in a flat or two-dimensional surface of the housing.

According to a further embodiment of this invention, the movable element is mechanically coupled to the first mounting element, wherein the generator is mechanically coupled to the second mounting element. The movable element is being moved when the first mounting element of the air spring moves with respect to the second mounting element along a working stroke direction of the air spring.

The movable element may be a rope, in particular a towing rope or traction rope, a cord, a wire or any other flexible, but relatively inelastic, longitudinal element, wherein the movable element may be connected to a rotatable wheel of the generator and rotates the wheel when the movable element is being moved in a direction of the working stroke. Metal wires, such as steel wires and aluminum wires, are of particular value for this purpose. In any case, the movement of the movable element in the longitudinal direction of the working stroke is transformed in a rotating movement of the generator wheel which is adapted to rotate the generator so as to generate electrical energy.

According to a further embodiment, the energy transforming unit is attached to the first mounting element, wherein the energy transforming unit is electrically connected via a power line to the distance measurement sensor, which distance measurement sensor is attached to the first mounting element. Thus, a through whole in the casing of the air spring, i.e. in the first mounting element, in the second mounting element, or in the belly in between the mounting elements for providing electrical energy to the sensing electronics or to the sensor is not required as the electrical energy is generated directly where it is needed, namely inside of the air spring. Further, as the energy transforming unit and the distance measurement sensor are attached to the same mounting element, no bending, friction, or other mechanical forces are being applied to the wire connecting the energy transforming unit and the distance measurement sensor when the air spring is in its operating state, i.e. one of the first mounting element and the second mounting element moves along the working stroke towards the other one.

According to a further embodiment, the energy transforming unit comprises a thermoelectric cooler which is adapted for generating electrical energy out of a temperature gradient. The thermoelectric cooler may be in particular a peltier element adapted for generating electrical energy out of temperature and temperature fluctuations or differences over the time of the gas or air in the air volume or in the surroundings or environment of the air spring. The temperature of the gas in the air volume may vary in the operating state of the air spring as the pressure of the gas in the air spring varies in the operating state, i.e. when being compressed or decompressed due to movements of the vehicle which result in movements of one of the first mounting element and the second mounting element towards the other one.

According to a further embodiment, the air spring as described above and hereinafter further comprises a pneumatic pressure generator, wherein the pneumatic pressure generator is adapted to vary an air pressure within the air volume of the air spring. The pneumatic pressure generator may be adapted to fill the air volume inside of the air spring with gas such as to achieve a working pressure of the air spring. During the operation of the air spring, the pneumatic pressure generator may refill or refresh the working pressure.

The propeller may be arranged within the air volume such that it is being rotated by the air flow caused by the pneumatic pressure generator when filling up the air volume with gas. Alternatively, when the propeller is arranged in the opening of the housing in the air volume, the pressure in the interior space of the housing will equalize to the pressure in the interior space outside of the housing which will cause an air flow through the opening and will thus set the propeller into turning or rotating movement.

According to a further embodiment of this invention, the pneumatic pressure generator is adapted to vary the air pressure within the air volume of the air spring prior to an operating state of the air spring. This enables generation of electrical energy out of the fluctuations of the gas pressure in the air volume of the air spring. The pressure may in particular be varied with a frequency which leads to a pressure change within the air volume without leading to a movement of one of the first mounting element and the second mounting element, i.e. the pressure variation may not be detected within a vehicle having the air spring as described above and hereinafter. For example, such a frequency may be within the range of 3 Hz to 15 Hz and allows generation of electrical energy without moving one of the first mounting element and the second mounting element but merely out of the increasing and decreasing gas pressure in the air volume. Thus, the sensing electronics is provided with electrical energy at the moment when the air spring starts its operating state.

According to a further embodiment, the pneumatic pressure generator is adapted to vary the air pressure within the air volume of the air spring during an operating state of the air spring. In cases where the gas pressure in the air volume does not change within a given period of time or the one of the first mounting element and the second mounting element does not move within that given period of time, the sensing electronics may become depleted of electrical energy. In order to provide electrical energy in a continuous mode during the operating state of the air spring or a vehicle having the air spring, the pressure generator may generate a sequence of pressure pulses after a predefined period of time after the last movement of one of the first mounting element and the second mounting element or of the last pressure alteration in the air volume. The predefined period of time may be on the order of a few seconds to a few minutes (within the range of 2 seconds to 10 minutes). For example, the predefined period may be only a few seconds, for instance between 10 seconds and 30 seconds, or a few minutes, for example a period which is within the range of 1 minute to 3 minutes.

Summing up, one major challenge in an air spring application may be to provide electrical energy to the sensor and/or its electronics, or to electronic functions, that is placed inside of an air spring device. The air spring unit is powered by pressured gas (for example by "air") and therefore it may be important to maintain a completely air tight chamber in order to avoid unwanted pressure losses.

When planning to use a wired based connection between the externally placed energy supply, and the air spring internally placed electronics, at least one hole may be necessary in the air spring casing (either in the rubber sleeve or belly, or in one of the two plates, i.e. the first mounting element or the second mounting element, that seal the rubber sleeve) to pass through the electrical supply and data communication lines. Because of the potentially high air pressure difference of tens of bars (between inside and outside of the air spring, i.e. between the air volume and the exterior surroundings of the air spring) it may be a costly challenge to design and to produce a reliable, air tight connector with the required properties, which could be assuring highest level of air tightness under all operational and environmental conditions, high air pressure differences, fast changing temperature changes (due to different expansion coefficients, for example), at least two from each other insulated electrical supply wires, potentially more than two separate wires to allow the transfer of the measurement signals and potentially the serial digital communication.

One possible disadvantage when considering of using a pneumatic pressure powered electrical power generator in an air spring application is the risk of having no electric power available after a longer resting period of the vehicle. Meaning, that when the vehicle (or the equipment) where the air spring unit has been installed has not been used for some time, then there will have been a time period of no pressure changes that may be needed to produce electrical energy. In other words, when the vehicle (for example a truck or a trailer) will be started (powered-up) after a resting period, then the electronics placed inside the air spring may not work due to lack of electric power. In the case of an electric powered, and fully integrated height sensor, there may be no sensor information available that could tell the truck driver or the appropriate control system that the air springs have been depleted of air and that the vehicles chassis is operating in a low position.

The air spring as described above and hereinafter and the electric power transforming unit relies on gas or air pressure changes that will be used to generate electricity. Under normal operating condition, the air spring will be supplied with some pressure (in the area of several bars to several 10 s of bars, in comparison to the ambient air pressure). The air spring is built into the vehicles suspension system and will experience some mechanical vibrations, depending on the quality of the road surface, the driving directions, and the vehicles speed.

Whenever the gas (air) pressure is changing, electrical energy can be generated. When the gas pressure remains constant there may be no electric energy production. The electric power consumption of the sensor and the sensor electronics may be very low (a few Milliampers, mA, or even only a fraction of a Milliamper) so that the focus will be on generating a certain minimum supply Voltage (example: in the area of 1.2 to 3.3 Volts).

Using an electric energy storage device, like a rechargeable battery or a high energy battery may be not desired for using in an air spring as this solution is not maintenance free. An air spring with built in sensor and sensor electronics has to function reliably of several years without having to change or replace a battery kind of energy storage device.

For practical reasons, the air spring built-in sensor system (like a height or distance measurement sensor system, or any other sensor system) has to function only after the electric power of the vehicle has been switched-on. Otherwise, there will be no electrical power available to process further the air spring sensor output signals, and no power is available (of any type) for the actuators of the system that may have to act on the sensor output signals. An example for the above statement is the following: to alter the height of an air spring unit, the pneumatic pressure generator has to be activated first, for which the electric power has to be switched on first.

The air spring as described above and hereinafter may work in one embodiment as follows: after switching on the electric power in a vehicle or system where the air spring is used, the pressure of the compressed air that is supplied to the air spring is modulated in a very short and few bursts. The air pressure changes can be so shortly spaced that the vehicles mechanics (chassis) will not be able to follow it at all (meaning that the vehicle structure will not experience any height changes as the pressure bursts are too short in time).

Pressure bursts mean, that very briefly the air pressure supplied to the air spring will be increased and dropped right afterwards. A few cycles of these bursts are sufficient to generate electric power inside the air spring. A simple pressure sensitive power generator will act on these short air pressure power bursts and produce enough electricity to start up part or all of the sensor system. One of the first actions of the height sensor system will be to measure the actual height (distance between the top and bottom) of the air spring, and make this information available to the sensor electronics. As soon as the vehicle is then moving, the vibration caused by the rolling vehicle will be sufficient to ensure continues electric energy supply inside the air spring.

The sensor and its electronics are placed inside an air spring and need electric supply to function. The air tight container of an air spring (inside the rubber belly) may be a challenge as the supply (and other) cables have to be passed from the inside to the outside of the otherwise air tight container (air-spring rubber belly). Using a differential pressure driven electric power generator, placed inside the air spring belly will provide the electricity needed by the sensors and electronics that is inside the air spring.

The communication between the inside and outside of the air spring for transmitting the sensed height or distance data can be then established through any of the available wireless communication solutions. The differential air pressure powered electric generator will rely on the wheel vibrations when driving over different roads. The unevenness of the road surface as well as changing the vehicles speed and direction will cause the wheels suspension to contract or extract a little (depending on the intensity with which the changes are happening). Under normal conditions, the supplied air pressure to the air spring may be kept constant for some time for a certain driving situation. Meaning that any vibrations or load changes (when changing the speed or the direction of the vehicle) experienced by the wheel will cause that the air spring will contract and expand accordingly which leads to pressure fluctuations. These contractions and expansions will cause that the air pressure inside the air spring belly will change, i.e. going up and down.

Whenever the vibrations needed are insufficient, or when the vehicle has been resting for a longer period of time, then there may be a risk that the electric energy stored inside the air spring is too low to power the sensors and the electronics. In such a case the air pressure supplied to the air spring has to be changed or modulated. This may be a time limited activity until enough electric power has been generated by the differential pressure generator which is built into the air spring.

When choosing to modulate the supplied air pressure, then the pressure changes are preferably such that they will not cause the vehicle structure to change its position as for example by moving up or down. This can be achieved by using a modulation frequency that is faster than the upper frequency with which the vehicle structure could follow. For instance, to accomplish this objective the modulation frequency can be within the range of about 3 Hertz to about 10 Hertz.

In order to provide long intervals between required maintenance procedures (to extend maintenance cycles) and because of very demanding outdoor operational conditions, such as in cases where the air spring is directly mounted to a structure that is holding the vehicles wheel, the utilization of standard or rechargeable batteries should be avoided. This is because standard batteries would need to be replaced after reaching their service life and because rechargeable batteries may require maintenance on a regular basis.

When applying an energy transforming unit as described above and hereinafter to an air spring, there is no need for an electric power transfer to the sensor electronics of the air spring unit. In one embodiment, electric power may be generated by using the air pressure differences between the pressured air supply and the decompression outlet. In another embodiment, electric power may be generated by using the naturally occurring air pressure modulations when the vehicle is on the move (caused by uneven road surface, or when turning the vehicle, or when accelerating and decelerating the vehicle). In another embodiment, the chassis or suspension vibrations of the vehicle may be used to create electric power in combination with an electric generator coil or a piezzo cell. In another example, temperature differences in combination with a peltier element may be used to generate electric energy.

According to a further embodiment, the data communication, i.e. transmitting the sensed height or distance date, from the inside of the air spring to the outside of the air spring may be done through modulating the air pressure with which the air spring is powered. This can be done in the audible range, sub audible range, or above the audible frequency range. This is a complete non electric solution of data communication (not relying on electromagnetic radio waves).

In one embodiment, when using an air spring valve in combination with the air spring, then the pneumatic valves (air in and air out) may be placed inside the air spring, and the entire system can be powered by air pressure differences. In such a case there will be no electric wire needed at all. Data communication to the pneumatic valve can be done through air pressure modulations. When the air spring unit has its own electrical control system to manage the entire height adjustment process, then there is no absolute need for data feedback (from the air spring system back to the outside of the air spring system).

The present invention more specifically discloses an air spring, comprising: a distance measurement sensor; an energy transforming unit; a first mounting element being adapted for being mounted to a first vehicle portion; a second mounting element being adapted for being mounted to a second vehicle portion; and an air volume arranged between the first mounting element and the second mounting element; wherein the energy transforming unit is adapted to transform a transition of the air spring from a first state (s1) of the air spring to a second state (s2) of the air spring into electrical energy and to provide the generated electrical energy to the distance measurement sensor; and wherein the energy transforming unit is arranged in the air volume of the air spring. In such an air spring the energy transforming unit can be comprised of a movable element and a generator; wherein the movable element is adapted for being moved when transitioning from the first state to the second state and is adapted to drive the generator; wherein the generator generates the electrical energy. For instance, the movable element can be a propeller.

These and other aspects of the present invention will become apparent from and elucidated with reference to the embodiments described hereinafter.

Figure 1:
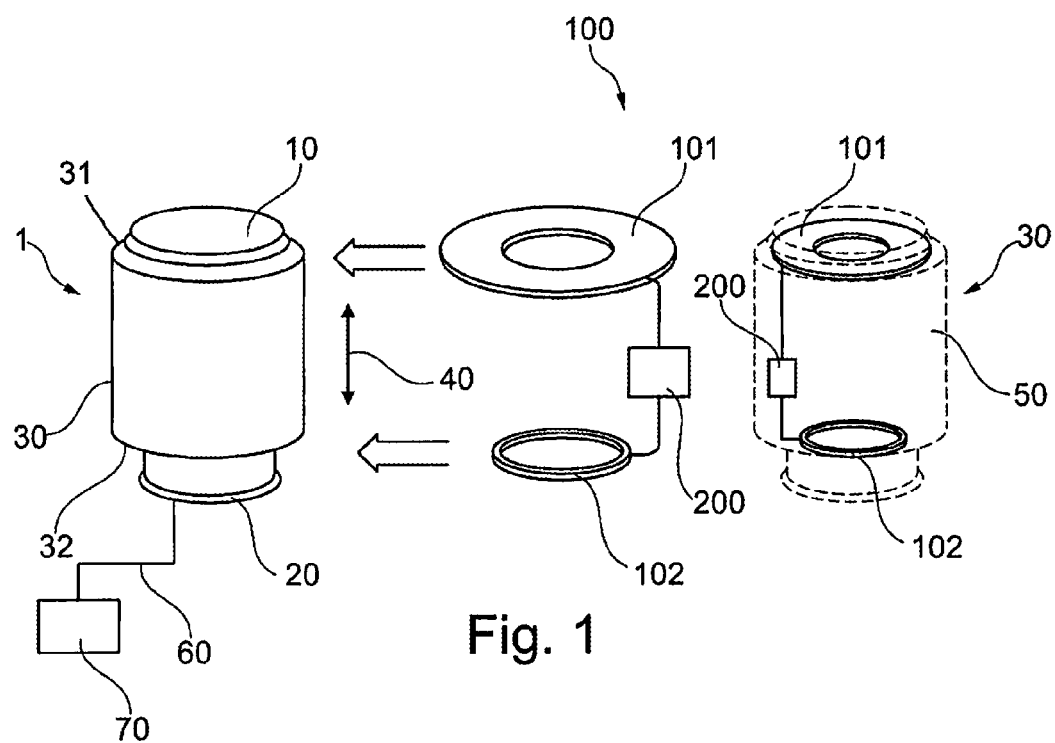
FIG. 1 illustrates an air spring according to an exemplary embodiment of the invention.

The reference numerals used in conjunction with the drawings hereof are as follows:
1 air spring
2 first vehicle portion
3 second vehicle portion
10 first mounting element
20 second mounting element
30 belly
31 first edge
32 second edge
40 working stroke
50 air volume
60 air pipe/pressure pipe
70 pneumatic pressure generator
100 air spring height sensor
101 receiver
102 height measuring signal transmitter
200 energy transforming unit
210 housing
220 opening
225A first air flow direction
225B second air flow direction
227 opening plane
230 supporting arm
240 propeller
245 direction of rotation
247 rotation plane
250 rotation axis
260 generator
265 thermoelectric cooler
270 power line
280 interior space inside the housing 210
281 interior space outside of the housing 210 and inside of the air volume 50
300 method for providing energy

DETAILED DESCRIPTION OF THE INVENTION

FIG. 1 illustrates an air spring 1 with a first mounting element 10 and a second mounting element 20. The air spring further comprises a belly 30 with a first edge 31 and a second edge 32. The first edge 31 of the belly 30 is mechanically interconnected with the first mounting element 10 and the second edge 32 is mechanically interconnected with the second mounting element 20.

The belly encloses an air volume 50 such that the working stroke 40 of the air spring represents a movement of one of the first mounting element 10 and the second mounting element 20 towards the other one of the first mounting element 10 and the second mounting element 20.

The air spring further comprises a pneumatic pressure generator 70 which is pneumatically connected to the air volume 50 of the air spring 1 by the air pipe or pressure pipe 60.

A receiver 101 in form of a coil and a height measuring signal transmitter 102 are located within the air volume of the air spring as indicated by the air spring illustrated in dotted lines. The receiver 101 is located close to the first mounting element 10 of the air spring and the height measuring signal transmitter 102 is located close to the second mounting element 20 of the air spring. Both, the receiver and the height measuring signal transmitter may be designed as coreless coils such that a working stroke 40 of the air spring is not reduced by these devices which are located within the air volume of the air spring.

The energy transforming unit 200 is electrically connected to the sensor or sensor electronics, i.e. to the receiver 101 and to the height measuring signal transmitter 102. The energy transforming unit 200 may be arranged inside of the air spring, i.e. within the air volume 50.

FIG. 1 shows the air spring and the air spring height sensor in both the mounted and the unmounted state, wherein on the left side of the drawing the unmounted state and on the right side of the drawing the mounted state is depicted.

The air spring as described above and hereinafter may in particular be a smart air spring with an air spring height sensor as described above and hereinafter as air spring level unit or height measurement system. The air spring may in particular be an air spring with intelligent sensor and actuator functions. One of the important features is the integrated air spring height sensor. The function of the air spring height sensor is it to measure with reasonable accuracy the current absolute axial position of the air spring, i.e. the distance between the first mounting element and the second mounting element. In other words, it determines or measures the current length of the air spring. Such a sensor solution may require its own, application specific electronics which will be described in more detail below.

The air spring height sensor as described above and hereinafter may offer the following features: reduced or no sensitivity to electromagnetic interferences (EMI), insensitive or fully compensated for the potential effects caused by temperature and temperature fluctuations or variations, reasonably high signal resolution for the targeted measurement range, no shortening of the original operating or working stroke of the air spring, low electric current consumption, fast signal response with a wide signal bandwidth range, low or no emissions of electromagnetic interferences, insensitive to metallic objects of different kinds that may be placed near the air spring or placed inside the air spring, wherein in the latter limits of maximum size and maximum mass of the metallic object apply, insensitive to changes of humidity, dirt and dust to a certain extent.

The air spring height sensor as described above and hereinafter is not limited to air spring applications. Wherever a large measurement stroke of a linear-position-sensor is required, this described electronics solution may be applicable. Large measurement stroke means that the signal amplitude ratio may change in exponential ratio, for example in a range greater than 1:100. Examples are (but not limited to): height and position changes in vehicle suspension system including all types of vehicles, like trucks, passenger cars, rains, planes, motor bikes, etc., control of industrial processing equipment like tooling, milling, drilling, mixing, filling, shifting, sorting, like luggage sorting and handling at airports, parcel sorting at the mail service, etc., test equipment like flight simulator, engine test bed, furniture reliability tests, sports equipment testing, etc., large scale, indirect load measurement systems like weight-on-beam design, large scale mining equipment like oil drilling, tunneling, steering and position control systems in ships (rudder position), planes (flaps, rudder,). Other applications for this application may be measuring accurately the distance to a metallic object, like when the engine (locomotive) of a train is coupling to a rail-road wagon, or when a pushing-truck at the airport is automatic or semi-automatic coupling to the front-wheel of a plain. When implementing an air spring height sensor as described above and hereinafter into a smart air spring system, it may be important not to shorten the actual mechanical stroke of the air spring.

There may exist several different ways to integrate an air spring height sensor as described above and hereinafter into an air spring. FIG. 1 shows one of these possibilities, where the height measuring signal transmitter 102 is placed at one end of the air spring body, i.e. at the second mounting element 20 (like the bottom) and the receiver 101 is placed at to other end of the air spring body, i.e. at the first mounting element 10. Other design solutions are that the height measuring signal transmitter and the receiver are placed at one and the same side (not shown in FIG. 1), for example.

Figure 2:
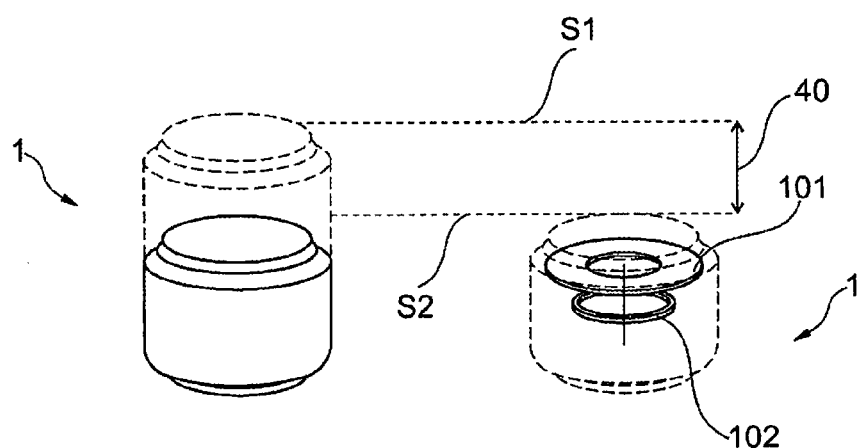
FIG. 2 illustrates an air spring according to a further exemplary embodiment of the invention.

FIG. 2 illustrates an air spring 1 in a first state or in a first or uncompressed state s1 on the left side of the drawing and the air spring 1 in a second or compressed state s2 on the right side of the drawing. The difference between the length of the air spring in the first state and in the second state corresponds to the maximum working stroke of the air spring. As the height measuring signal transmitter and the receiver are designed as coils with a minimum extension in direction of the working stroke, the working stroke of the air spring is almost not or not reduced when arranging the air spring height sensor as described above and hereinafter within the air volume of the air spring.

The specification of an air spring set by manufacturers may define the usable working stroke range 40 which is shown in connection with the first state and the second state of the air spring in FIG. 2. In particular, the user of the air spring should not alter the air spring as to inflate it any higher or deflate it any lower than described in the manufacturer's specification. Going beyond the specified "Min/Max" positions may result in damages to the rubber belly of the air spring. In any case, to avoid damaging the air spring height sensor components when the air spring may get fully deflated, the individual sensing components height measuring signal transmitter and receiver have to be spaced sufficiently so that they never crash into each other at the minimum distance or when the air spring takes the second state. In a preferred embodiment, the air spring height sensor as described above and hereinafter may be built in such way that the height measuring signal transmitter and the receiver may come very close to each other when the air spring is fully deflated or collapsed.

The second state is the state in which the sensor signal transfer is most efficient and therefore the largest height signal can be expected at the output of the passive or active working signal receiver. This signal may also be called the original or untreated height signal.

When moving from the second state to the first state, the distance between the height measuring signal transmitter and the receiver steadily increases such that the original height signal is decreasing, wherein the decreasing may occur exponentially.

Figure 3:
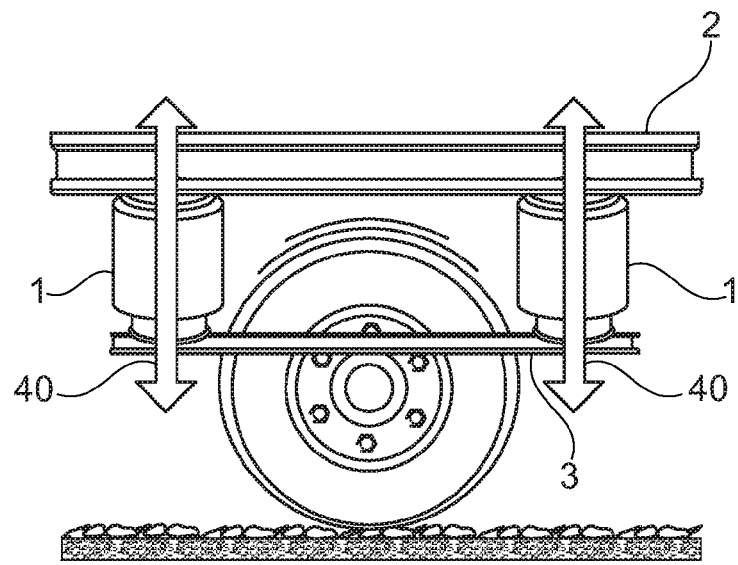
FIG. 3 illustrates a wheel suspension with an air spring according to a further exemplary embodiment of the invention.

FIG. 3 illustrates a wheel suspension of a vehicle with two air springs 1 as described above and hereinafter. The second vehicle portion 3, i.e. the movable part of the wheel suspension which is mounted to the wheel, is adapted to move along the arrows 40, which correspond to the measuring distance and the working stroke of the air springs, wherein one mounting element of the air spring is attached to the second vehicle portion. The other one of the mounting elements of the air spring is mounted to the first vehicle portion 2.

Figure 4:
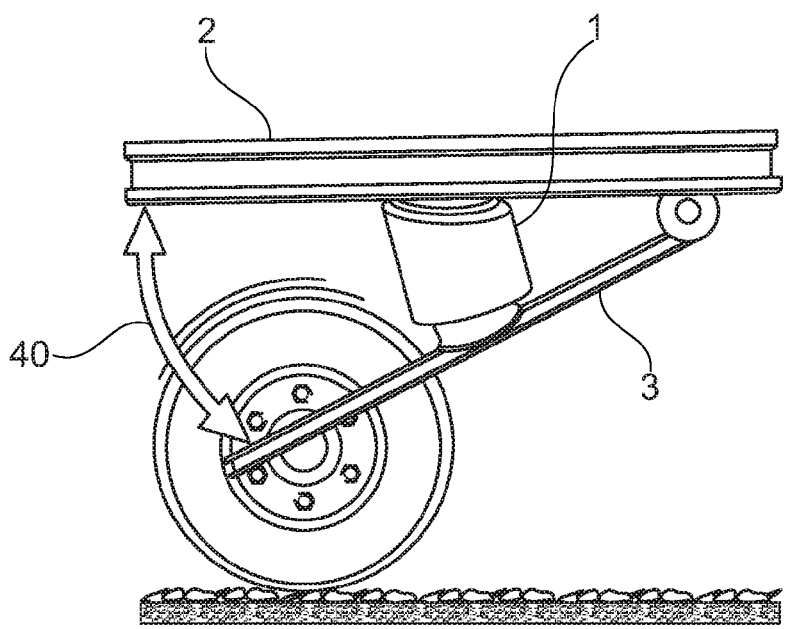
FIG. 4 illustrates a wheel suspension with an air spring according to a further exemplary embodiment of the invention.

FIG. 4 illustrates an alternative wheel suspension of a vehicle with one air spring 1, wherein one of the mounting elements of the air spring is attached to the movable second vehicle portion 3 and the other one of the mounting elements is attached to the first vehicle portion 2. The second vehicle portion is rotatably movable around a hinge which mechanically interconnects the first vehicle portion and the second vehicle portion.

Figure 5A:
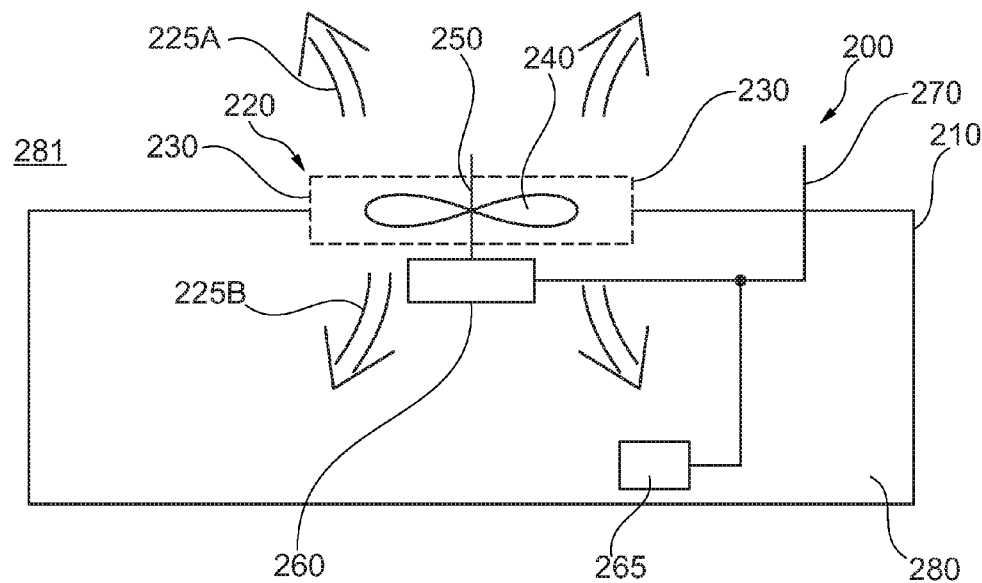
FIG. 5A illustrates an energy transforming unit of an air spring according to a further exemplary embodiment of the invention.

FIG. 5A illustrates an energy transforming unit 200 for an air spring as described above and hereinafter. The energy transforming unit 200 comprises a housing 210 with rigid walls, wherein one of the surfaces or side walls of the housing has an opening 220. In the opening 220, a propeller 240 having a rotation axis 250 is arranged such that the rotation axis is orthogonal to the opening plane of the opening 220. The rotation axis is held in position by a supporting arm 230 which is arranged at the housing 210.

The propeller 240 is connected to the generator 260 via the shaft 250. Thus, when the air flow 225A, 225B flows into or out of the housing 210 from the interior space 280 within the housing to the interior space 281 outside the housing, the propeller is being turned or set in rotation such that the generator is driven to generate electric energy. The generator provides the electric energy to the sensor electronics via the power line 270. In addition to the generator, a thermoelectric cooler element 265 may be provided within or out of the housing in order to generate electric current for providing to the sensor electronics via the power line 270.

Figure 5B:
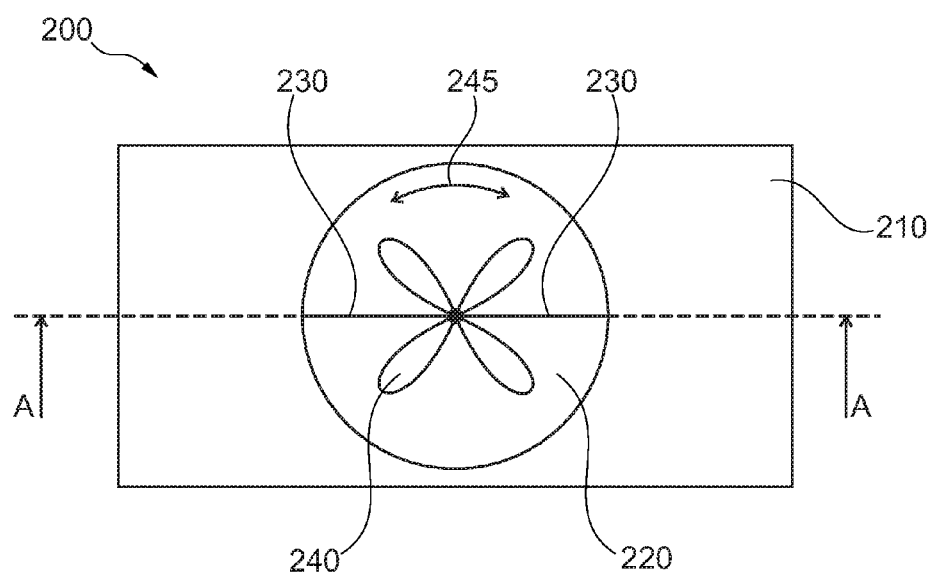
FIG. 5B illustrates an energy transforming unit of an air spring according to a further exemplary embodiment of the invention.

FIG. 5B illustrates a top view on the energy transforming unit 200 shown in FIG. 5A, wherein FIG. 5A is a section view along the intersecting line A-A. The top surface of the housing comprises the opening in which the propeller 240 is arranged such that the rotation axis extends into and out of the drawing plane. The propeller is adapted to rotate in any of the two directions indicated by the arrow 245, i.e. clockwise at an air flow 225A in a first air flow direction or counterclockwise at an air flow 225B in a second air flow direction.

Figure 5C:
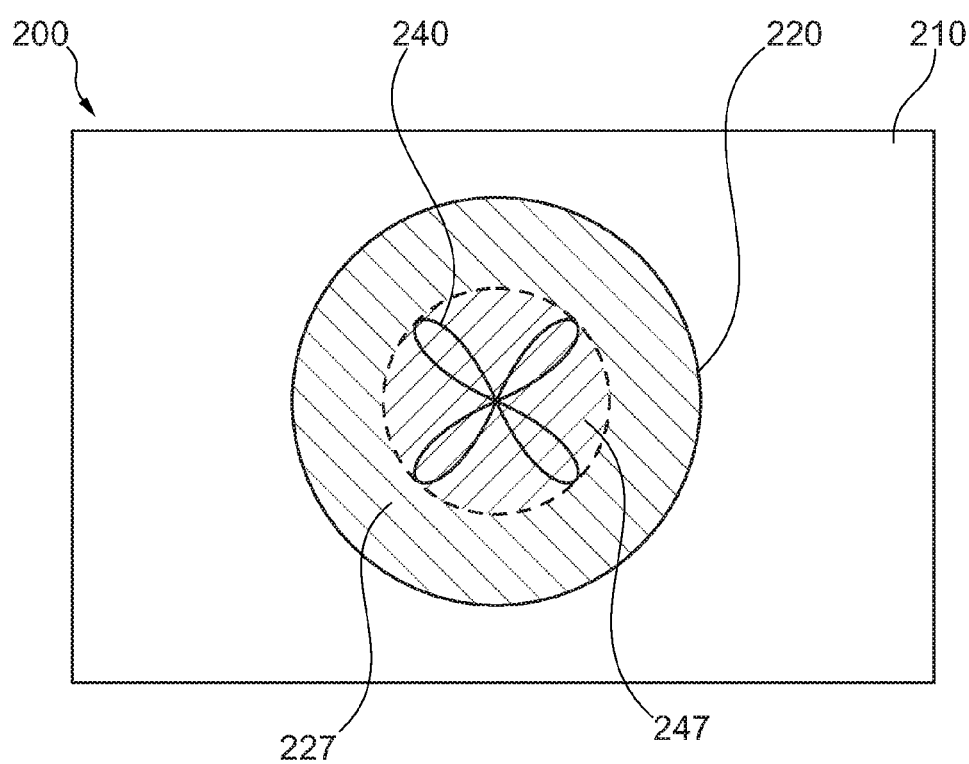
FIG. 5C illustrates an energy transforming unit of an air spring according to a further exemplary embodiment of the invention.

FIG. 5C illustrates a top view of the housing and indicates the rotation plane 247 of the propeller and the opening plane 227 of the opening 220. The rotation plane may be parallel to the opening plane or may coincide with the opening plane.

This application claims benefit of European Patent Application Serial No. EP 1315663.5, filed on Jan. 17, 2013. While certain representative embodiments and details have been shown for the purpose of illustrating the subject invention, it will be apparent to those skilled in this art that various changes and modifications can be made therein without departing from the scope of the subject invention.

What is claimed is:

1. An air spring, comprising:
a distance measurement sensor;
an energy transforming unit comprising a propeller and a generator;
a first mounting element being adapted for being mounted to a first vehicle portion;
a second mounting element being adapted for being mounted to a second vehicle portion;
an air volume arranged between the first mounting element and the second mounting element,
wherein the energy transforming unit is adapted to transform a transition of the air spring from a first state (s1) of the air spring to a second state (s2) of the air spring into electrical energy and to provide the generated electrical energy to the distance measurement sensor;
wherein the propeller is adapted for being moved when transitioning from the first state to the second state and is adapted to drive the generator,
wherein the generator generates the electrical energy; and
wherein the distance measurement sensor is arranged within and receives the generated electrical energy within the air volume of the air spring; and
a pneumatic pressure generator adapted for varying air pressure within the air spring,
wherein the pneumatic pressure generator is positioned within the air volume of the air spring, and
wherein the pneumatic pressure generator is adapted to modulate a pressure in the air volume when the generated electrical energy is below a threshold.

2. The air spring according to claim 1, wherein the propeller is adapted to being rotated when the pressure in the air volume of the air spring varies as a result of the transition from the first state to the second state.

3. The air spring according to claim 1 wherein the propeller is mechanically coupled to the generator via an axis.

4. The air spring according to claim 3, wherein the energy transforming unit comprises a housing with an opening and rigid walls, and wherein the propeller is arranged in the opening.

5. The air spring according to claim 4, wherein the propeller is adapted to being rotated when an air pressure in the air volume of the air spring varies such as to cause an air flow through the opening.

6. The air spring according to claim 5, wherein a rotation plane of the propeller extends along an opening plane of the opening such that a rotation axis of the propeller extends along an air flow direction through the opening.

7. The air spring according to claim 6, wherein the housing comprises an interior space such that a variation of the air pressure in the air spring leads to an air exchange between an interior space outside the housing and the interior space inside the housing through the opening; and wherein the air exchange causes the propeller to rotate.

8. The air spring according to claim 5, wherein a rotation plane of the propeller is parallel to an opening plane of the opening.

9. The air spring according to claim 8, wherein the housing comprises an interior space such that a variation of the air pressure in the air spring leads to an air exchange between an interior space outside the housing and the interior space inside the housing through the opening; and wherein the air exchange causes the propeller to rotate.

10. The air spring according to claim 5, wherein the housing comprises an interior space such that a variation of the air pressure in the air spring leads to an air exchange between an interior space outside the housing and the interior space inside the housing through the opening; and wherein the air exchange causes the propeller to rotate.

11. The air spring according to claim 1, wherein the energy transforming unit and the distance measurement sensor are each attached to the first mounting element; and wherein the energy transforming unit is electrically connected via a power line to the distance measurement sensor.

12. An air spring comprising:
a distance measurement sensor;
an energy transforming unit comprising a thermoelectric cooler which is adapted for generating electrical energy out of a temperature gradient;
a first mounting element being adapted for being mounted to a first vehicle portion;
a second mounting element being adapted for being mounted to a second vehicle portion; and
an air volume arranged between the first mounting element and the second mounting element,
wherein the energy transforming unit is adapted to transform a transition of the air spring from a first state (s1) of the air spring to a second state (s2) of the air spring into electrical energy and to provide the generated electrical energy to the distance measurement sensor,
wherein the distance measurement sensor is arranged within and receives the generated electrical energy within the air volume of the air spring; and
wherein the temperature gradient is a temperature gradient between temperature fluctuations of gas in the air volume of the air spring.

13. An air spring comprising:
a distance measurement sensor;
an energy transforming unit;
a pneumatic pressure generator adapted for varying air pressure within the air spring;
a first mounting element being adapted for being mounted to a first vehicle portion;
a second mounting element being adapted for being mounted to a second vehicle portion; and
an air volume arranged between the first mounting element and the second mounting element,
wherein the energy transforming unit is adapted to transform a transition of the air spring from a first state (s1) of the air spring to a second state (s2) of the air spring into electrical energy and to provide the generated electrical energy to the distance measurement sensor,
wherein the energy transforming unit generates the electrical energy using the variations of the air pressure in the air spring,
wherein the distance measurement sensor is arranged within and receives the generated electrical energy within the air volume of the air spring; and wherein the pneumatic pressure generator is positioned within the air volume of the air spring.

14. The air spring according to claim 13, wherein the pneumatic pressure generator is adapted to vary the air pressure within the air volume of the air spring prior to an operating state of the air spring.

15. The air spring according to claim 13, wherein the pneumatic pressure generator is adapted to vary the air pressure within the air volume of the air spring during an operating state of the air spring.

16. The air spring according to claim 13, wherein the pneumatic pressure generator is adapted to vary the air pressure within the air volume of the air spring during an operating state of the air spring.

17. An air spring, comprising:
a distance measurement sensor;
an energy transforming unit comprising a coil and a magnetic element;
a first mounting element adapted for being mounted to a first vehicle portion;
a second mounting element adapted for being mounted to a second vehicle portion;
an air volume arranged between the first mounting element and the second mounting element,
wherein the energy transforming unit is adapted to transform a transition of the air spring from a first state (s1) of the air spring to a second state (s2) of the air spring into electrical energy and to provide the generated electrical energy to the distance measurement sensor,
wherein the electrical energy is transformed when the coil is moved with respect to the magnetic element, and
wherein the distance measurement sensor is arranged within and receives the generated electrical energy within the air volume of the air spring; and
a pneumatic pressure generator adapted for varying air pressure within the air spring,
wherein the pneumatic pressure generator is positioned within the air volume of the air spring, and
wherein the pneumatic pressure generator is adapted to modulate a pressure in the air volume when the generated electrical energy is below a threshold.

18. The air spring of claim 17, wherein the distance measurement sensor and the energy transforming unit are adapted to be coupled to either the first mounting element or the second mounting element.

* * * * *